(12) United States Patent
Liu et al.

(10) Patent No.: US 7,594,744 B2
(45) Date of Patent: Sep. 29, 2009

(54) BACKLIGHT MODULE

(75) Inventors: Chang-Chun Liu, Shenzhen (CN); Xiao-Lin Gan, Shenzhen (CN); Yu-Kuang Ho, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/828,356

(22) Filed: Jul. 26, 2007

(65) Prior Publication Data
US 2008/0106904 A1      May 8, 2008

(30) Foreign Application Priority Data
Nov. 3, 2006    (CN) ................. 2006 1 0201065

(51) Int. Cl.
*F21V 7/04* (2006.01)

(52) U.S. Cl. .................. 362/625; 362/309; 349/62

(58) Field of Classification Search .......... 362/309, 362/329, 625, 629; 349/62, 64, 65, 97
See application file for complete search history.

(56) References Cited

U.S. PATENT DOCUMENTS

| | | | |
|---|---|---|---|
| 5,046,826 A * | 9/1991 | Iwamoto et al. | 349/65 |
| 5,479,275 A * | 12/1995 | Abileah | 349/5 |
| 2007/0064441 A1 | 3/2007 | Chen | |
| 2007/0183137 A1* | 8/2007 | Iwasaki | 362/97 |

* cited by examiner

*Primary Examiner*—John A Ward
(74) *Attorney, Agent, or Firm*—Frank R. Niranjan

(57) ABSTRACT

A backlight module includes a light source and a light guide plate. The light guide plate includes a base plate and a reflecting film. The base plate has an upper surface on which a plurality of protrusions is formed, a curved bottom surface opposite to the upper surface, and a housing defined therein. The light source is accommodated in the housing. The reflecting film is plated on the curved bottom surface, for reflecting the light beams reaching the curved bottom surface to emit from the upper surface. The plurality of protrusions diffuses light beams.

13 Claims, 3 Drawing Sheets

BACKLIGHT MODULE

BACKGROUND OF THE INVENTION

1. Field of the Invention

The present invention relates to backlight modules, and particularly to backlight modules for use in light display devices such as liquid crystal displays.

2. Description of Related Art

In a liquid crystal display device, liquid crystal does not itself radiate light. Instead, the liquid crystal relies on receiving light from a light source, thereby displaying images and data. In the case of a typical liquid crystal display device, a backlight module powered by electricity supplies the needed light.

Backlight modules generally include edge-lighting type backlight modules and direct type backlight modules. Referring to FIG. 3, a conventional direct type backlight module includes four light sources 100, a reflector 200, a diffusion plate 300, and two brightness enhancement plates 400, 500. The light sources 100 can be column shaped cold cathode fluorescent lamps. Two ends of each light source 100 are fixed with a bezel of a liquid crystal display device (not shown). The light sources 100 are positioned between the reflector 200 and diffusion plate 300. Some light beams emitted from the light sources 100 go up to the diffusion plate 300. Some light beams emitted from the light sources 100 go down to the reflector 200. The diffusion plate 300 includes a plurality of protrusions therein, for receiving light beams from the light sources 100, and for evenly diffusing the light beams to the brightness enhancement plates 400. The reflector 200 reflects the light beams from the light sources 100 to the diffusion plate 300. The brightness enhancement plates 500, 600 are disposed on the diffusion plate 400 sequentially to provide light beams with enhanced brightness for the liquid crystal. However, the light sources 100 are tightly contacted with the reflector 200 in assembly, forming contacting areas. The light beams emitted from contacting areas of the light sources 100 are lost.

What is needed, therefore, is a backlight module with highly efficient utilization of light beams.

SUMMARY OF THE INVENTION

A backlight module with highly efficient utilization of light beams is provided. In an embodiment, the backlight module includes a light source and a light guide plate. The base plate has an upper surface on which a plurality of protrusions is formed, a curved bottom surface opposite to the upper surface, and a housing defined therein. The light source is accommodated in the housing. Some of light beams emitted from the light source go to the upper surface of the base plate, and some of light beams emitted from the light source go to the curved bottom surface of the base plate. The reflecting film is plated on the curved bottom surface, for reflecting the light beams reaching the curved bottom surface to emit from the upper surface. The plurality of protrusions diffuses light beams.

Other advantages and novel features will become more apparent from the following detailed description when taken in conjunction with the accompanying drawings, in which:

DETAILED DESCRIPTION OF THE INVENTION

Figure 1:
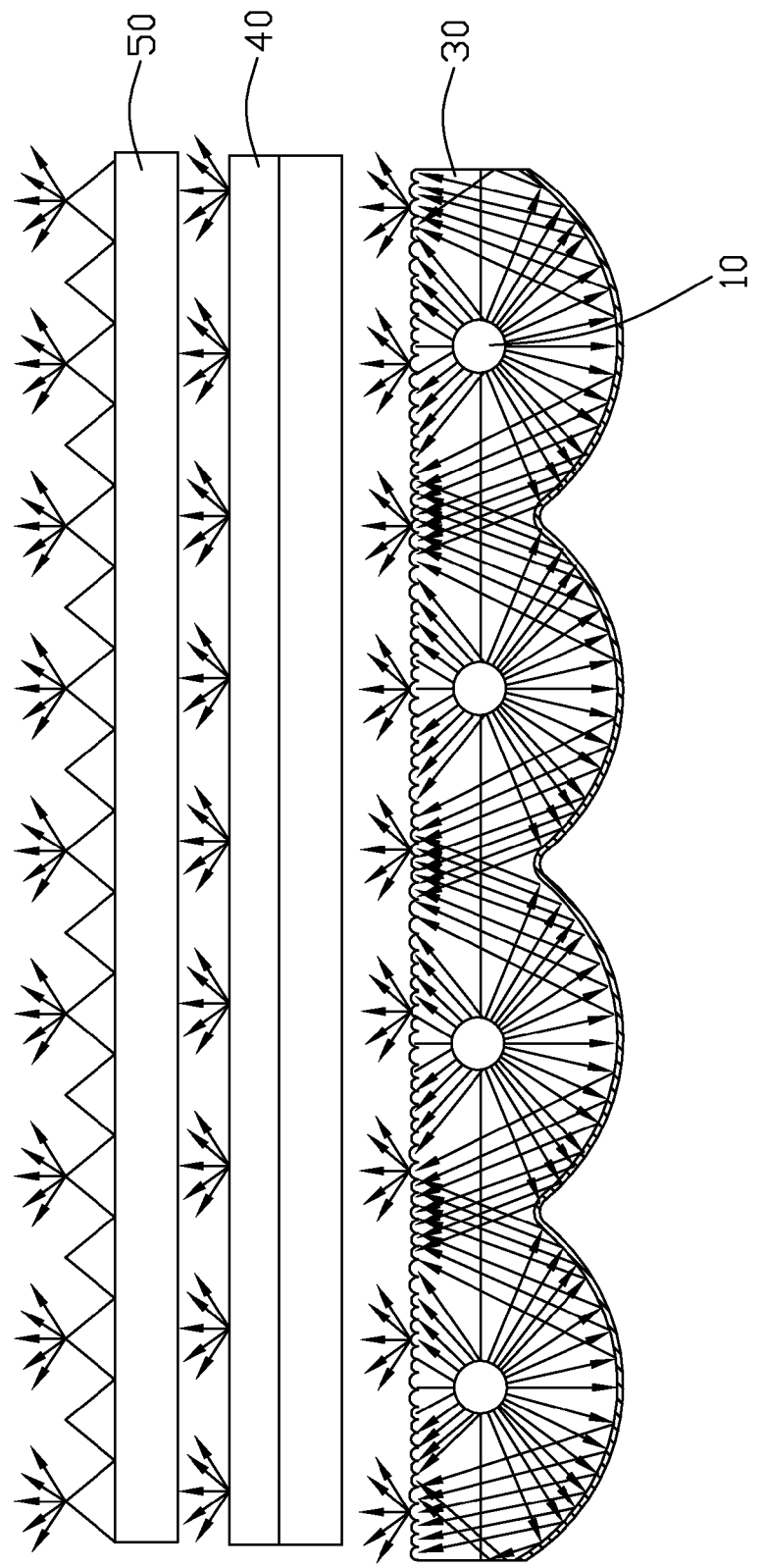
FIG. 1 is a schematic, front view of a backlight module in accordance with an embodiment of the present invention.
Figure 2:
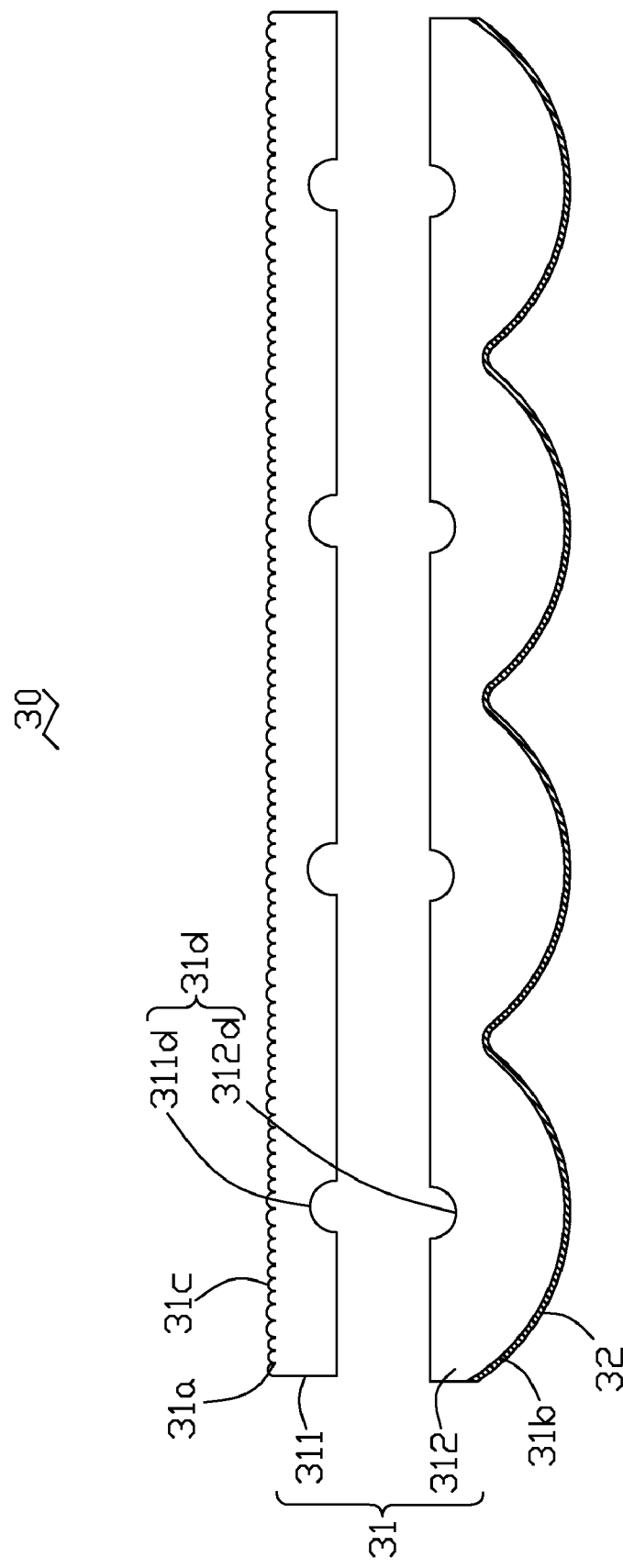
FIG. 2 is a schematic, front view of a light guide plate of FIG. 1.
Figure 3:
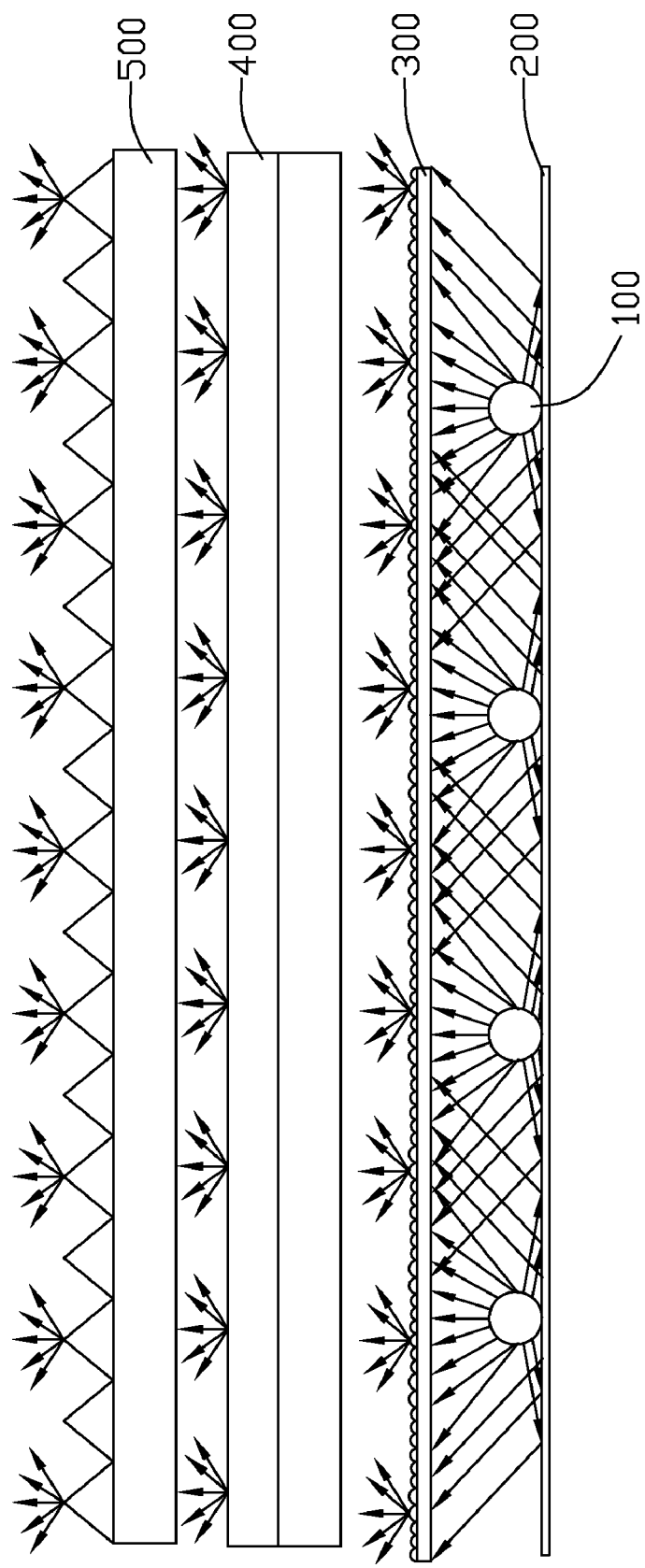
FIG. 3 is a schematic, front view of a conventional backlight module.

Referring to FIG. 1 and FIG. 2, a backlight module in accordance with an embodiment of the present invention includes four light sources 10, a light guide plate 30, and two brightness enhancement plates 400, 500.

The light sources 10 used in the backlight module can be column shaped cold cathode fluorescent lamps. The light guide plate 30 includes a base plate 31 made of acrylic material, and a reflecting film 32 made of silver or aluminum material with good light reflecting characteristics. The base plate 31 has a top surface 31a on which a plurality of protrusions 31c are formed, a curved bottom surface 31b opposite to the top surface 31a, and four housings 31d therein. The base plate 31 is made up of an upper base plate 311 and a lower base plate 312. The upper base plate 311 and the lower base plate 312 are separately formed and then assembled together. The upper base plate 311 defines a first slot 311d therein. The lower base plate 312 defines a second slot 312d corresponding to the first slot 311d. The first slot 311d and the second slot 312d cooperatively forms the housing 31d for accommodating the light source 10. In this embodiment, the first slot 311d and the second slot 312d both are semicolumn shaped and cooperate form a column housing 31d fitting with the column shaped light source 10. Alternatively, the base plate 31 and the housings 31d can be integrally formed. The reflecting film 32 is plated on the curved bottom surface 31b.

Some light beams emitted from the light sources 10 go to the top surface 31a of the base plate 31, and some light beams emitted from the light sources 10 go to the curved bottom surface 31b of the base plate 31. The reflecting film 32 reflects the light beams to emit from the top surface 31a. Because the reflecting film 32 follows the curvature of the curved bottom surface 31b, the degree of the curvature can be chosen such that the light beams reflected by the reflecting film 32 follow a path providing a desired dispersion pattern. The plurality of protrusions 31c diffuse light beams that exit from the top surface 31a. The diffused light beams transmit through the brightness enhancement plates 400, 500, and finally illuminate a liquid crystal panel (not shown). A diffusion module separated from the light guide plate 30 can also be used to diffuse light beams instead of the plurality of protrusions.

The reflecting film 32 is spaced from the light sources 10 and forms a curved shape. Therefore, the backlight module of the invention improves the utilization efficiency of the light beams that enter the curved bottom surface 31b compared to conventional art, wherein the reflector is tightly contacted with the light sources. Furthermore, the light sources 10 accommodated in the base plate 31 of the light guide plate 30 are better positioned compared to conventional art, wherein the light sources are fixed with a bezel of a liquid crystal display device.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A backlight module configured to uniformly illuminate a liquid crystal display panel, comprising:

a light guide plate comprising a base plate and a reflecting film, the base plate having an upper surface on which a plurality of protrusions is formed, a curved bottom surface opposite to the upper surface, and a housing defined therein; and a light source accommodated in the housing, some of light beams emitted from the light source going to the upper surface of the base plate, and some of light beams emitted from the light source going to the curved bottom surface of the base plate, wherein the reflecting film is plated on the curved bottom surface, for reflecting the light beams reaching the curved bottom surface to emit from the upper surface, the plurality of protrusions diffusing the light beams, the base plate comprises a first portion and a second portion separately formed and then assembled together, the first portion having an edge adjacent an edge of the second portion, a slot defined in one of the adjacent edges.

2. The backlight module as claimed in claim 1, further comprising a light brightness enhancement plate disposed on the plurality of protrusions.

3. The backlight module as claimed in claim 1, wherein the light guide plate is made of acrylic material.

4. The backlight module as claimed in claim 1, wherein the reflecting film is made of silver or aluminum material with good light reflecting characteristics.

5. The backlight module as claimed in claim 1, wherein the housing comprises another slot defined in the first portion, the another slot facing and communicating with the slot.

6. A backlight module configured to uniformly illuminate a liquid crystal display panel, comprising:

a light guide plate comprising a base plate and a reflecting film, the base plate having an upper surface, a curved bottom surface opposite to the upper surface, and a housing defined therein;

a light source accommodated in the housing, some of light beams emitted from the light source going to the upper surface of the base plate, and some of light beams emitted from the light source going to the curved bottom surface of the base plate, the reflecting film being plated on the curved bottom surface for reflecting light beams reaching the curved bottom surface to emit from the upper surface; and a diffusion module positioned on the upper surface of the light guide plate, for diffusing the light beams;

wherein the base plate comprises a first portion and a second portion separately formed and then assembled together, the housing comprises a first slot defined in the first portion and a second slot defined in the second portion, the first slot facing and communicating with the second slot.

7. The backlight module as claimed in claim 6, further comprising a light brightness enhancement plate disposed on the diffusion module.

8. The backlight module as claimed in claim 6, wherein the light guide plate is made of acrylic material.

9. The backlight module as claimed in claim 6, wherein the reflecting film is made of silver or aluminum material with good light reflecting characteristics.

10. A light guide plate for a light source, comprising:

a base plate comprising a top surface configured for diffusing light beams emitted from the light source, a curved bottom surface opposing the top surface, and a housing disposed between the top surface and the bottom surface configured to accommodate the light source therein and spaced from the bottom surface to avoid the reflecting film contacting with the light source; and a reflecting film plated on the curved bottom surface configured to reflect light beams reaching the bottom surface to the top surface for diffusing, wherein the base plate comprises an upper plate on which the top surface is formed and a lower plate on which the curved bottom surface is formed, the upper and lower plates are separately formed and each have a connecting surface, the housing comprises a first slot defined in the connecting surface of the upper plate and a second slot defined in the connecting surface of the lower plate, the upper and lower plates are assembled together with the connecting surfaces of the upper and lower plates firmly contacting each other and the first slot communicating with the second slot.

11. The light guide plate as claimed in claim 10, wherein a plurality of protrusions is formed on the top surface of the base plate for diffusing the light beams.

12. The light guide plate as claimed in claim 10, wherein a diffusion module is disposed on the top surface of the base plate for diffusing the light beams.

13. The light guide plate as claimed in claim 10, wherein the first slot and the second slot both are semicolumn shaped.

* * * * *